United States Patent
Arshad et al.

(10) Patent No.: US 9,098,558 B2
(45) Date of Patent: Aug. 4, 2015

(54) ENHANCED FLEXIBILITY FOR USERS TO TRANSFORM XML DATA TO A DESIRED FORMAT

(71) Applicant: Oracle International Corporation, Redwood Shores, CA (US)

(72) Inventors: Azeem Arshad, Trivandrum (IN); Pribin Chacko, Kottayam (IN); Prabakar Paulsami, Tirunelveli District (IN)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 13/924,644

(22) Filed: Jun. 24, 2013

(65) Prior Publication Data

US 2014/0297670 A1 Oct. 2, 2014

Related U.S. Application Data

(60) Provisional application No. 61/817,889, filed on May 1, 2013, provisional application No. 61/806,959, filed on Apr. 1, 2013.

(51) Int. Cl.
G06F 17/30 (2006.01)
G06F 17/22 (2006.01)
G06F 17/27 (2006.01)

(52) U.S. Cl.
CPC ........ *G06F 17/30569* (2013.01); *G06F 17/227* (2013.01); *G06F 17/2247* (2013.01); *G06F 17/272* (2013.01); *G06F 17/3092* (2013.01)

(58) Field of Classification Search
None
See application file for complete search history.

(56) References Cited

U.S. PATENT DOCUMENTS

| | | | |
|---|---|---|---|
| 6,725,426 B1 * | 4/2004 | Pavlov | 715/205 |
| 7,028,310 B2 | 4/2006 | Hertling et al. | |
| 7,228,497 B2 * | 6/2007 | Lander | 715/234 |
| 7,483,983 B1 | 1/2009 | Bonefas et al. | |
| 7,500,195 B2 | 3/2009 | Sahota et al. | |
| 7,634,726 B2 | 12/2009 | Ims et al. | |
| 7,721,202 B2 * | 5/2010 | Fuchs et al. | 715/249 |
| 7,926,064 B2 | 4/2011 | Fernandez et al. | |

(Continued)

OTHER PUBLICATIONS

Batch transform many xml files, http://www.altova.com/support_faq_ide_xsl.html, Downloaded circa May 30, 2012, pp. 1-3.

(Continued)

*Primary Examiner* — Hung Le
(74) *Attorney, Agent, or Firm* — IPHorizons PLLC

(57) ABSTRACT

An aspect of the present disclosure provides enhanced flexibility for users to transform XML data to a desired format. In an embodiment, a configuration data indicates the specific elements required for generating the output for other elements. During a first pass, any occurrences of the specific elements in an input XML data are populated in a cache. During a second pass, XSL transformation rules are used for transforming the elements of the XML data. When an XSL transformation requires a specific element stored in the cache, the specific element is retrieved and an output portion is formed by incorporating the retrieved element according to the XSL transformation rule. According to another aspect, the configuration data also specifies various context objects that are enabled to interface with corresponding external (data) sources. Accordingly, data from external sources is enabled to be incorporated in the output according to XSL transformation rules.

18 Claims, 10 Drawing Sheets

(56) References Cited

U.S. PATENT DOCUMENTS

| | | | |
|---|---|---|---|
| 8,645,973 | B2* | 2/2014 | Bosworth et al. ............. 719/320 |
| 2003/0037031 | A1 | 2/2003 | Birder |
| 2003/0167254 | A1* | 9/2003 | Su et al. ............................ 707/1 |
| 2004/0010754 | A1* | 1/2004 | Jones ............................ 715/513 |
| 2004/0034830 | A1* | 2/2004 | Fuchs et al. ................ 715/501.1 |
| 2004/0205562 | A1* | 10/2004 | Rozek et al. .................. 715/513 |
| 2005/0010896 | A1* | 1/2005 | Meliksetian et al. ......... 717/106 |
| 2005/0108209 | A1* | 5/2005 | Beyer et al. ....................... 707/3 |
| 2005/0210374 | A1* | 9/2005 | Lander .......................... 715/513 |
| 2006/0253465 | A1* | 11/2006 | Willis et al. ................... 707/100 |
| 2006/0277248 | A1 | 12/2006 | Baxter et al. |
| 2007/0234211 | A1 | 10/2007 | Henderson |
| 2008/0077856 | A1 | 3/2008 | Gazzillo |
| 2009/0006454 | A1 | 1/2009 | Zarzar et al. |
| 2009/0007115 | A1* | 1/2009 | Sun et al. ...................... 718/100 |
| 2009/0300656 | A1* | 12/2009 | Bosworth et al. ............. 719/320 |
| 2011/0066809 | A1* | 3/2011 | Kinoshita ..................... 711/118 |
| 2011/0303753 | A1* | 12/2011 | Alleshouse ................... 235/492 |
| 2013/0204910 | A1* | 8/2013 | Sawant et al. ................. 707/811 |

OTHER PUBLICATIONS

CoherentWeb User Guide for V4.0, http://qutoric.com/coherentweb/resources/coherentweb.pdf, Date Aug. 14, 2011, pp. 1-83.

XML File Transformation: .Config File Transformation, http://www.olegsych.com/2010/12/config-file-transformation/, Date Dec. 19, 2010, pp. 1-13.

XSL Formatting Objects, http://en.wikipedia.org/wiki/XSL_Formatting_Objects, downloaded circa Jul. 15, 2013, pp. 1-9.

* cited by examiner

```xml
<COMPOSITE xmlns="http://xmlns.acme.com/ku" version="1.0">  <-------- 410
<BASE_OBJECT>
 <TABLE>
  <SCHEMA>FUSION</SCHEMA>  <-------- 421
  <NAME>AP_PAY_GROUP</NAME>  <-------- 422
  <RELATIONAL_TABLE>
   <COL_LIST>
    <COL_LIST_ITEM>
     <NAME>PAY_GROUP_ID</NAME>
     <DATATYPE>NUMBER</DATATYPE>
     <PRECISION>18</PRECISION>
     <SCALE>0</SCALE> <NOT_NULL/>
     <CUSTOMER_AREA>
     <ODB_PROPERTY_LIST>
      <COMMENT>System generated primary key</COMMENT>
     </ODB_PROPERTY_LIST>
     <UDP_LIST>
      <UDP_LIST_ITEM>
       <NAME>logicalName</NAME><VALUE>PAY_GROUP_ID</VALUE>
      </UDP_LIST_ITEM>
      <UDP_LIST_ITEM>
       <NAME>translateFlag</NAME><VALUE>N</VALUE>
      </UDP_LIST_ITEM>
     </UDP_LIST>
     </CUSTOMER_AREA>
    </COL_LIST_ITEM>...
   </COL_LIST>
   <PRIMARY_KEY_CONSTRAINT_LIST>
    <PRIMARY_KEY_CONSTRAINT_LIST_ITEM>
     <NAME>AP_PAY_GROUP_PK</NAME>
     <COL_LIST>
      <COL_LIST_ITEM><NAME>PAY_GROUP_ID</NAME></COL_LIST_ITEM>
     </COL_LIST>
     <DISABLE/>
     <CUSTOMER_AREA>
      <UDP_LIST>
       <UDP_LIST_ITEM>
        <NAME>constrDescription</NAME><VALUE>No REMARK column in Cl_CONSTRAINTS</VALUE>
       </UDP_LIST_ITEM>
```

```
...
    <UDP_LIST_ITEM>
      <NAME>shortName</NAME><VALUE/>
    </UDP_LIST_ITEM>
  </UDP_LIST>
</CUSTOMER_AREA>
</PRIMARY_KEY_CONSTRAINT_LIST_ITEM>
</PRIMARY_KEY_CONSTRAINT_LIST>                                          ⎫
<FOREIGN_KEY_CONSTRAINT_LIST>                                           ⎬ 430
<FOREIGN_KEY_CONSTRAINT_LIST_ITEM>
  <NAME>AP_PAY_GROUP_FK1</NAME>
  <COL_LIST>
    <COL_LIST_ITEM><NAME>TEMPLATE_ID</NAME></COL_LIST_ITEM>
  </COL_LIST>                                                           ⎫
  <REFERENCES>                                                          ⎬ 450
    <SCHEMA>AP</SCHEMA>
    <NAME>AP_PAYMENT_TEMPLATES</NAME>
    <COL_LIST>
      <COL_LIST_ITEM><NAME>TEMPLATE_ID</NAME></COL_LIST_ITEM>
    </COL_LIST>
  </REFERENCES> ....
</FOREIGN_KEY_CONSTRAINT_LIST_ITEM>
<FOREIGN_KEY_CONSTRAINT_LIST_ITEM>
  <NAME>AP_PAY_GROUP_FK2</NAME>
  <COL_LIST>
    <COL_LIST_ITEM><NAME>CHECKRUN_ID</NAME></COL_LIST_ITEM>
  </COL_LIST>                                                           ⎫
  <REFERENCES>                                                          ⎬ 460
    <SCHEMA>AP</SCHEMA>
    <NAME>AP_INV_SELECTION_CRITERIA_ALL</NAME>
    <COL_LIST>
      <COL_LIST_ITEM><NAME>CHECKRUN_ID</NAME></COL_LIST_ITEM>
    </COL_LIST>
  </REFERENCES>....
</FOREIGN_KEY_CONSTRAINT_LIST_ITEM>
</FOREIGN_KEY_CONSTRAINT_LIST> ....
</RELATIONAL_TABLE> ....
</TABLE>
</BASE_OBJECT> ....
</COMPOSITE>
```

*FIG. 4B*

```xml
<config>
  <transformation>
    <name>Repository Tables Transformation</name>                                    ← 521
    <input-type>"http://xmlns.acme.com/ku" "COMPOSITE"</input-type>                  ← 522
    <xsl>trans.xsl</xsl>           ← 523
    <parameter>nCacheFK</parameter>
    <parameter>dbConn</parameter>
    <parameter>idGen</parameter>
  </transformation>                                                                  } 525
  <context-object>
    <name>nCacheFK</name>
    <class>acme.axt.NodeCache</class>
    <parameter> <name>nsPrefixes</name><value>"ku" "http://xmlns.acme.com/ku" "util" "acme.axt.TransUtil"</value></parameter>
    <parameter> <name>select</name><value>/ku:COMPOSITE/ku:BASE_OBJECT/ku:TABLE/ku:RELATIONAL_TABLE/
        ku:FOREIGN_KEY_CONSTRAINT_LIST/ku:FOREIGN_KEY_CONSTRAINT_LIST_ITEM</value></parameter>     } 535
    <parameter> <name>key</name><value>ku:REFERENCES/ku:NAME </value></parameter>
    <parameter> <name>context-selects</name><value> "/ku:COMPOSITE/ku:BASE_OBJECT/ku:TABLE/ku:NAME"'/ku:COMPOSITE/
        ku:BASE_OBJECT/ku:TABLE/ku:SCHEMA" </value></parameter>
  </context-object>
  <context-object>
    <name>dbConn</name>
    <class>acme.axt.DBConnector</class>
    <parameter> <name>driver</name><value>acme.jdbc.driver.AcmeDriver</value></parameter>
    <parameter> <name>jdbc-url</name><value>jdbc:acme:thin:@localhost:1521:orcl</value></parameter>
    <parameter> <name>username</name><value>offlin</value></parameter>
    <parameter> <name>password</name><value>offlin</value></parameter>
    <parameter> <name>sql-queries</name><value> "lba_query" "SELECT id FROM oer_tax START WITH key =
        (SELECT lba FROM oer_pr5_table_lba WHERE tablename =?)CONNECT BY PRIOR parent = id" "STRING"</value></parameter>
  </context-object>
  <context-object>
    <name>idGen</name>
    <class>acme.axt.IDGenerator</class>
    <parameter> <name>StartID</name> <value>3000</value></parameter>
  </context-object>
</config>
```

*FIG. 5*

```
<xsl:stylesheet version="2.0" xmlns:ku="http://xmlns.acme.com/ku" ... xmlns:xsl="http://www.w3.org/1999/XSL/Transform">
  <xsl:param name="nCacheFK"/>
  <xsl:param name="dbConn"/>                                                                                  ⎫
  <xsl:param name="idGen"/>                                                                                   ⎬ 610
  <xsl:variable name="assetId"><xsl:value-of select="idg:getID($idGen, $assetName)"/></xsl:variable> ◄—620
  <xsl:variable name="assetName"><xsl:value-of select="/ku:COMPOSITE/ku:BASE_OBJECT/ku:TABLE/ku:NAME"/></xsl:variable>
  <xsl:variable name="fkRefs" select="nc:get($nCacheFK,/ku:COMPOSITE/ku:BASE_OBJECT/ku:TABLE/ku:NAME)"/> ◄—630
  <xsl:template match="/">
    <asset id="{$assetId}"> ◄—625                                                                             ⎫
      ...                                                                                                     ⎬ 622
      <mandatory-data>
        <name><xsl:value-of select="$assetName"/></name> ◄—628
        <version>11.1.5.0.0</version>
        <description>
          <xsl:value-of select="/ku:COMPOSITE/ku:BASE_OBJECT/ku:TABLE/ku:CUSTOMER_AREA/
                                ku:ODB_PROPERTY_LIST/ku:COMMENT"/> </description>
      <relationships>
        <ReferencedAssets id="118" direction="ORDERED-BIDIRECTIONAL">
          <secondary display="References">                                                                    ⎫
            <xsl:for-each select="/ku:COMPOSITE/ku:BASE_OBJECT/ku:TABLE/ku:RELATIONAL_TABLE/                   |
                                  ku:FOREIGN_KEY_CONSTRAINT_LIST/ku:FOREIGN_KEY_CONSTRAINT_LIST_ITEM">        |
              <xsl:variable name="id" select="idg:getID($idGen,ku:REFERENCES/ku:NAME)"/>                       ⎬ 645
              <xsl:if test="$id != $assetId"><asset id="{$id}"/></xsl:if>                                     |
            </xsl:for-each>                                                                                   |
          </secondary>                                                                                        ⎭
          <primary display="Referenced by">                                                                   ⎫
            <xsl:for-each select="$fkRefs/item">                                                              |
              <xsl:variable name="id" select="idg:getID($idGen,context/ku:NAME)"/>                            ⎬ 640
              <xsl:if test="$id != $assetId"><asset id="{$id}"/></xsl:if>                                     |
            </xsl:for-each>                                                                                   |
          </primary>...                                                                                       ⎭
        </ReferencedAssets>
      </relationships>
```

*FIG. 6A*

```
<categorization-types>
    <FusionApps-LBA>
        <xsl:for-each select="dbc:execute($dbConn,'lba_query',concat('"', $assetName, '"'))/row">     ⎫
            <categorization>                                                                          ⎬ 650
                <xsl:attribute name="id"> <xsl:value-of select="column"/></xsl:attribute>
            </categorization>
        </xsl:for-each>                                                                               ⎭
    </FusionApps-LBA>
</categorization-types>
</mandatory-data>
<custom-data>
<schema><xsl:value-of select="/ku:COMPOSITE/ku:BASE_OBJECT/ku:TABLE/ku:SCHEMA"/></schema>    ← 671
<object-name><xsl:value-of select="/ku:COMPOSITE/ku:BASE_OBJECT/ku:TABLE/ku:NAME"/></object-name>  ← 672
<object-type>TABLE</object-type>...
<foreign-keys> ...
    <xsl:for-each select="$fkRefs/item">                                                              ⎫
        <xsl:if test="context/ku:NAME != $assetName">                                                 ⎪
            <foreign-keys>                                                                            ⎪
                <table> <xsl:value-of select="context/ku:NAME"/> </table>                             ⎪
                <foreign-table>                                                                       ⎪
                    <xsl:value-of select="value/ku:FOREIGN_KEY_CONSTRAINT_LIST_ITEM/ku:REFERENCES/ku:NAME"/>  ⎬ 660
                </foreign-table>                                                                      ⎪
                <foreign-key-column>                                                                  ⎪
                    <xsl:value-of select="tu:joinNodes(value/ku:FOREIGN_KEY_CONSTRAINT_LIST_ITEM/ku:COL_LIST/
                        ku:COL_LIST_ITEM/ku:NAME/text(), ', ')"/>                                     ⎪
                </foreign-key-column>                                                                 ⎪
            </foreign-keys>                                                                           ⎪
        </xsl:if>                                                                                     ⎪
    </xsl:for-each>                                                                                   ⎭
</foreign-keys>
</custom-data> ...
</asset>
</xsl:template>
</xsl:stylesheet>
```

*FIG. 6B*

```xml
<asset id="3099">                                                              ← 710
  <mandatory-data>
    <name>AP_PAY_GROUP</name>                                                   ← 715
    <version>11.1.5.0.0</version>
    <description><![CDATA[This table has been created to allow the user to select multiple values for the pay groups ...]]></description>
    <relationships>
      <ReferencedAssets direction="ORDERED-BIDIRECTIONAL" id="118">
        <secondary display="References">
          <asset id="3052"/>
          <asset id="3032"/>
        </secondary>                                                            ⎱ 735
        <primary display="Referenced by"/>                                      ← 730
      </ReferencedAssets>
    </relationships>
    <categorization-types>
      <FusionApps-LBA>
        <categorization id="50153"/>
        <categorization id="50151"/>                                            ⎱ 720
        <categorization id="50132"/>
        <categorization id="50131"/>
      </FusionApps-LBA>
    </categorization-types>
  </mandatory-data>
  <custom-data>
    <schema>FUSION</schema>                                                     ← 761
    <object-name>AP_PAY_GROUP</object-name>...                                  ← 762
    <foreign-keys>
      <table>AP_PAY_GROUP</table>
      <foreign-table>AP_PAYMENT_TEMPLATES</foreign-table>                       ⎱ 740
      <foreign-key-column>TEMPLATE_ID</foreign-key-column>
    </foreign-keys>
    <foreign-keys>
      <table>AP_PAY_GROUP</table>
      <foreign-table>AP_INV_SELECTION_CRITERIA_ALL</foreign-table>              ⎱ 750
      <foreign-key-column>CHECKRUN_ID</foreign-key-column>
    </foreign-keys> ...
  </custom-data>
</asset>
```

*FIG. 7*

ENHANCED FLEXIBILITY FOR USERS TO TRANSFORM XML DATA TO A DESIRED FORMAT

RELATED APPLICATIONS

The present applications is non-provisional of and claims priority from the below two US Provisional applications, which are both incorporated in their entirety herewith:

A. entitled, "ENHANCED FLEXIBILITY FOR USERS TO TRANSFORM XML DATA TO A DESIRED FORMAT", Application No. 61/817,889, filed on: 1 May 2013, First Named Inventor: Azeem Arshad; and B. entitled, "ADVANCED XML TRANSFORMATION USING JAVA BASED CONTEXT OBJECTS", Application No. 61/806,959, filed on: 1 Apr. 2013, First Named Inventor: Azeem Arshad.

BACKGROUND OF THE DISCLOSURE

1. Technical Field

The present disclosure relates to transformation of eXtensible Markup Language (XML) data and more specifically to providing enhanced flexibility for users to transform XML data to a desired format.

2. Related Art

XML (eXtensible Markup Language) refers to a language/specification used for describing information/data. XML enables users to specify desired characteristics (of the data being described) in the form of associated elements, with each element typically containing a corresponding start and end tag, and optionally attributes. At least the start tag contains an identifier to uniquely identify the element. Desired data portions are enclosed between the respective start and end tags of an element, implying that the enclosed data is described by the corresponding identifier.

In general, the user may specify any desired elements for describing the data. Such a feature is in sharp contrast to other markup languages such as HTML (hypertext markup language), where the elements are generally pre-defined, and a user is enabled only to associate the data being described with the desired pre-defined elements.

There is often a need to transform XML data to another format. Such another format could be XML data characterized using different sets of elements (and/or respective attributes), plain unstructured text format, other structured formats (e.g., consistent with PDF, Word Document, data base format), etc.

XSL (eXtensible Stylesheet Language) is a commonly used specification for specifying such XML transformations. A user specifies several transformation rules according to XSL, with each transformation rule specifying the output portion corresponding to an element in the input XML. The transformation rules may include pre-defined functions according to XPath (XML Path Language) specification, as is well known in the arts. The transformation rules and pre-defined functions are respectively described in the documents entitled "XSL Transformations (XSLT) Version 1.0, W3C Recommendation" and "XML Path Language (XPath) Version 1.0 W3C Recommendation", both dated 16 Nov. 1999 and both available from W3 Consortium located at W3C/MIT, 32 Vassar Street, Room 32-G515, Cambridge, Mass. 02139.

However, such XSL (and XPath) based approaches may be inadequate for specifying transformations in several environments. Aspects of the present disclosure provide enhanced flexibility for users to transform XML data to a desired format, as described below with examples.

BRIEF DESCRIPTION OF THE DRAWINGS

Example embodiments of the present disclosure will be described with reference to the accompanying drawings briefly described below.

FIGS. 4A and 4B together depicts portions of input XML data received for transformation in one embodiment.

FIG. 5 depicts portions of a configuration data specifying the transformations to be performed for different input XML data in one embodiment.

FIGS. 6A and 6B together depict sample XSL transformation rules to be used for transforming XML data to a desired format in one embodiment.

FIG. 7 depicts portions of output XML data generated by transformation of XML data to a desired format in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides enhanced flexibility for users to transform XML data to a desired format. In an embodiment, a configuration data indicates the identifiers of the specific elements required for generating the output for other elements. During a first pass, any occurrences of the specific elements in an input XML data are populated in a cache. During a second pass, XSL transformation rules are used for transforming the elements of the XML data. When an XSL transformation requires a specific element stored in the cache, the specific element is retrieved and an output portion is formed by incorporating the retrieved element according to the XSL transformation rule.

Thus, users/administrators specifying the XSL transformation rules are provided an additional capability of storing desired elements in a cache during a first pass, and then later accessing the cached elements for generating the output portions during a second pass.

According to another aspect of the present disclosure, a configuration data specifies various context objects that are enabled to interface with corresponding external (data) sources. Each context object represents an executable module that provides functionalities in addition to the pre-defined functions (noted above) available in XSL/XPath. When an XSL transformation rule used for transforming an input XML data indicates that a specific context object is to be used, the specific context object is invoked to retrieve a data from the corresponding external source and an output portion is formed by incorporating the retrieved data according to the XSL transformation rule.

Thus, by enabling users to specify transformations based on incorporation of data from external sources, the flexibility for the users to transform XML data to a desired format is enhanced.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
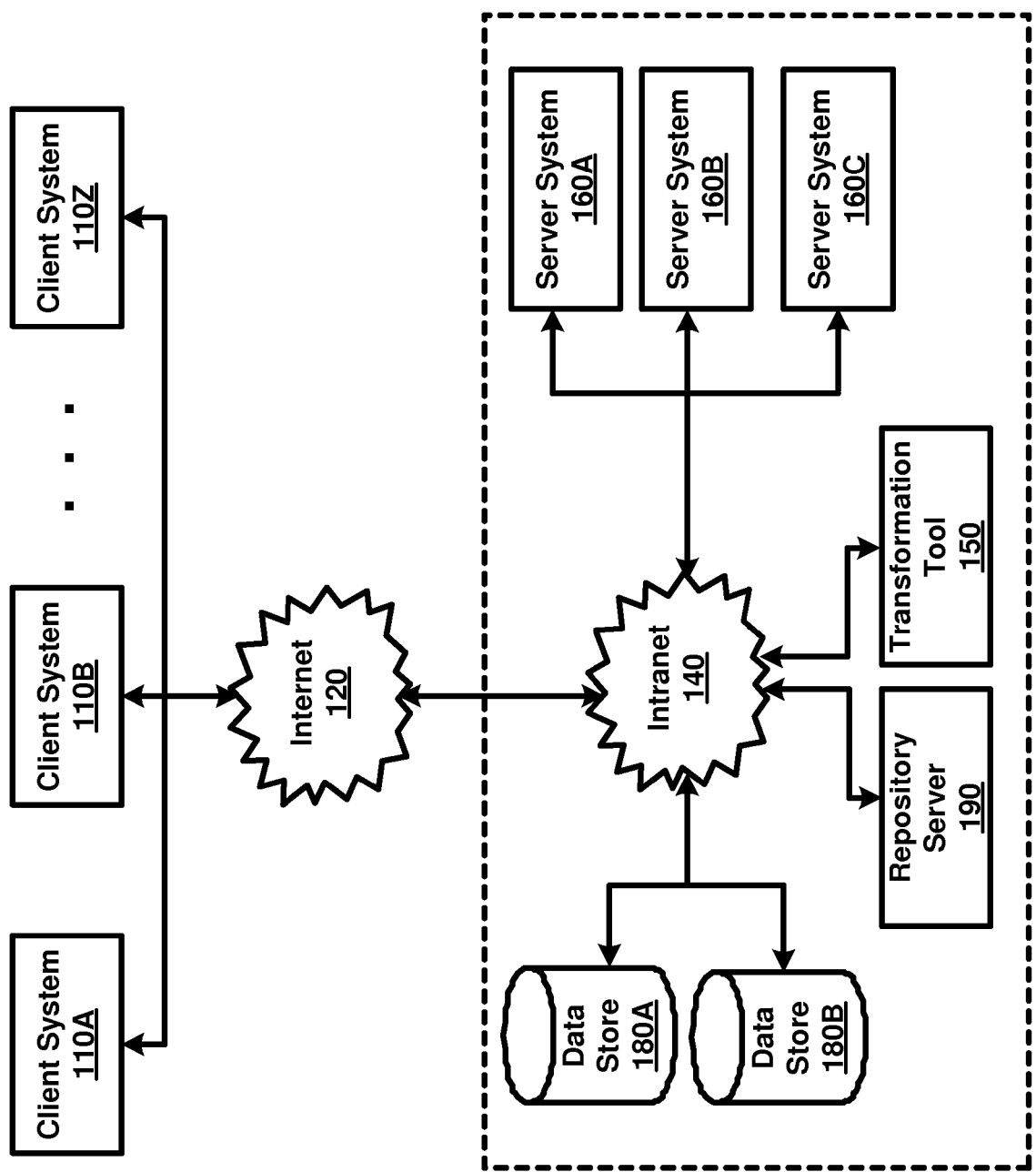
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing client systems 110A-110Z, Internet 120, intranet 140, transformation tool 150, server systems 160A-160C, data stores 180A-180B and repository server 190.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between transformation tool 150, server systems 160A-160C, data stores 180A-180B, and repository server 190, all provided within an enterprise (shown with dotted boundaries). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 140 and Internet 120.

Each of data stores 180A-180B represents a non-volatile (persistent) storage facilitating storage and retrieval of a collection of data by applications executing in other systems of the enterprise such as transformation tool 150, server systems 160A-160C and repository server 190. Each data store may be implemented as a database server using relational database technologies and accordingly provide storage and retrieval of data using structured queries such as SQL (Structured Query Language). Alternatively, each data store may be implemented as a file server providing storage and retrieval of data in the form of files organized as one or more directories, as is well known in the relevant arts.

Each of client systems 110A-110Z represents a system such as a personal computer, workstation, mobile device, etc., used by users to generate (user) requests directed to applications executing in server systems 160A-160C. The requests may be generated using appropriate user interfaces. In general, a client system requests an application for performing desired tasks/services (such as accessing a resource hosted by the data center, invoking a service, etc.) and receives corresponding responses containing the results of performance of the requested tasks/services.

Each of server systems 160A-160C represents a server, such as a web/application server, executing applications capable of performing tasks requested by users using client systems 110A-110Z. In response to receiving a client request from a client system, a server system performs the tasks specified in the request and sends the result of performance of the tasks to the requesting client system. The server system may use data stored internally (for example, in a non-volatile storage/hard disk within the server), external data (for example, in data stores 180A-180B) and/or data received from other sources (e.g., from the user) in performing such tasks.

It may be appreciated that the applications executing in server systems 160A-160C may represent various software products (forming part of a software suite) used to manage the different functions (such as human capital, customer relationship, finance, etc.) of an enterprise/business entity. An example of such a software suite is Oracle Fusion Middleware 11g available from Oracle Corporation, the intended Applicant of the instant patent application. In such a scenario, it may be desirable that users (such as managers in the enterprise) be provided information on the details of the implementation of the applications.

Repository server 190 represents a system that maintains the details of various assets used in the implementation of the software suite. Examples of such assets are tables and views specified in data stores 180A-180B (when implemented as database servers), web services provided by the applications executing in server system 160A-160C, data structures used by the applications, etc. In general, repository server 190 maintains metadata related to such assets, and provides such metadata in response to requests from users (e.g., using client systems 110A-110Z). An example of repository server 190 is Oracle Enterprise Repository, available from Oracle Corporation.

It may be appreciated that the asset metadata maintained in repository server 190 is often in a format not easily understandable to the users. In one embodiment, the asset metadata is maintained according to XML format. At least for such a reason, it may be desirable to transform the asset metadata into a more understandable format before being provided to users. The related transformation may also require incorporation of data from external sources (e.g., data values stored in data stores 180A-180B).

Transformation tool 150 provided according to the present disclosure enables such transformation of XML data (maintained in repository server 190) to a desired/more understandable format. The manner in which transformation tool 150 is operative is described below with examples.

3. Transforming XML Data

Figure 2:
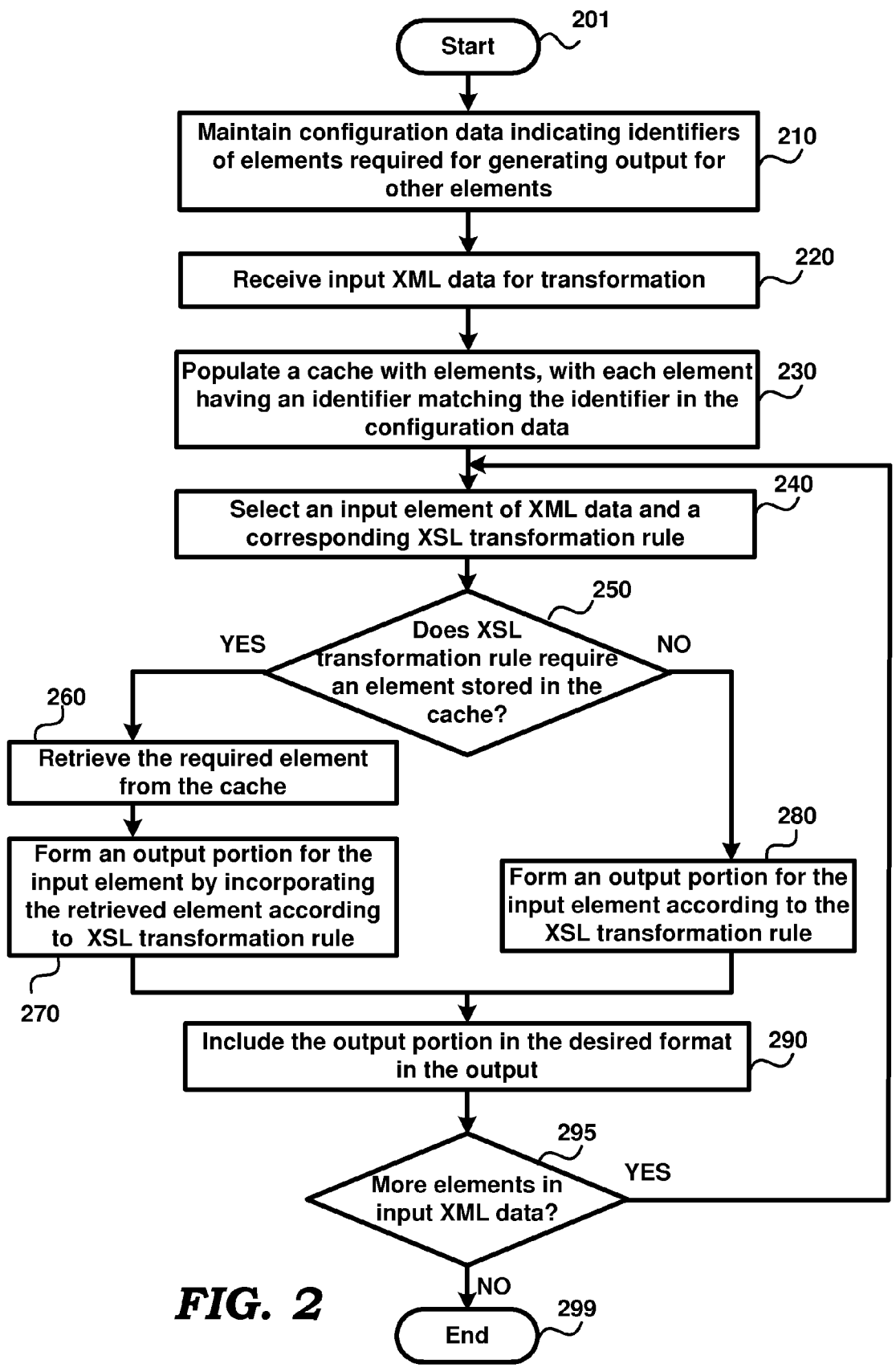
FIG. 2 is a flow chart illustrating the manner in which input XML data is transformed to output data in a desired format in one embodiment.

FIG. 2 is a flow chart illustrating the manner in which input XML data is transformed to output data in a desired format in one embodiment. The flowchart is described with respect to the systems of FIG. 1, in particular, transformation tool 150, merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, transformation tool 150 maintains configuration data indicating identifiers of elements (of XML inputs) required for generating output for other elements (of the XML inputs). The configuration data may be maintained in a non-volatile memory provided in one of data stores 180A-180B. The configuration data may be provided by an administrator, for example, based on the knowledge of the structure of the XML inputs sought to be transformed in accordance with the features of the present disclosure.

In step 220, transformation tool 150 receives input XML data for transformation. The input XML data may represent an asset metadata that is to be transformed into a more user understandable format, as noted briefly above. As may be readily appreciated, the input XML data contains multiple elements. Each element is identified by a corresponding identifier and further contains other elements and/or data values according to the XML specification.

In step 230, transformation tool 150 populates a cache with elements, with each cached element having an identifier matching the identifier in the configuration data. Such populating may entail parsing of all of the elements of the input XML data. The parsing may be viewed as a first pass of processing of the input XML data. In other words, in view of the administrator having specified the identifiers of elements that would be used for transforming other elements (of the input XML data), the cache is populated with the elements having the specified identifiers.

In step 240, transformation tool 150 selects an input element of input XML data and a corresponding XSL transformation rule. It may be appreciated that the loop of steps 240-295 operates to select and process input elements in successive iterations, and the sequence in which the elements are selected, can be based on any suitable convention. For example, if the input XML data is parsed according to a SAX (Simple API for XML) based approach, the input elements may be selected based on sequence of occurrence of the corresponding start tags in the input XML data. Alternatively, if the input XML data is parsed according to a DOM (Document Object Model) based approach, the sequence may be based on a breadth first or depth first traversal of the DOM.

A set of XSL transformation rules may be provided for transforming the input XML data and the corresponding XSL transformation rule provided for the selected input element may be selected in step 240. The set of XSL transformation rules may also be provided by an administrator.

In step 250, transformation tool 150 checks whether the XSL transformation rule requires an element stored in the cache. According to a convention described below, the text of the XSL transformation rule explicitly specifies that the cache is to be accessed for a required element. Control passes to step 260 if an element stored in the cache is indicated to be required, and to step 280 otherwise.

In step 260, transformation tool 150 retrieves the required element from the cache. Transformation tool 150 thereafter forms an output portion for the input element by incorporating at least a portion of the retrieved element according to XSL transformation rule, in step 270. Control then passes to step 290.

In step 280, transformation tool 150 forms an output portion for the input element according to the XSL transformation rule. It may be appreciated that the output portion is formed in step 280, without requiring access to elements stored in the cache. Control then passes to step 290.

In step 290, transformation tool 150 includes the output portion, formed in step 270 or 280, in the desired format in the output. In step 295, transformation tool 150 checks whether more elements are present for processing in input XML data. The check may be performed according to the same convention noted above with respect to step 240. Control then passes to step 240, if there are additional elements to be processed, and to step 299 otherwise.

The flowchart ends in step 299. It should be appreciated that the examination required in steps 290/240 to select successive elements for further processing, may be viewed as a second pass of processing of the input XML data.

It may be appreciated that the users/administrators, providing the XSL transformation rules are provided an additional capability of storing desired elements in a cache during a first pass, and then later accessing the cached elements for generating the output portions during a second pass. Such additional capability can be conveniently used by users to transform XML data into desired format, as suitable in corresponding situations.

The description is continued with respect to an example implementation and also a desired output format that can be obtained in accordance with example embodiments of the disclosure.

4. Example Implementation

Figure 3:
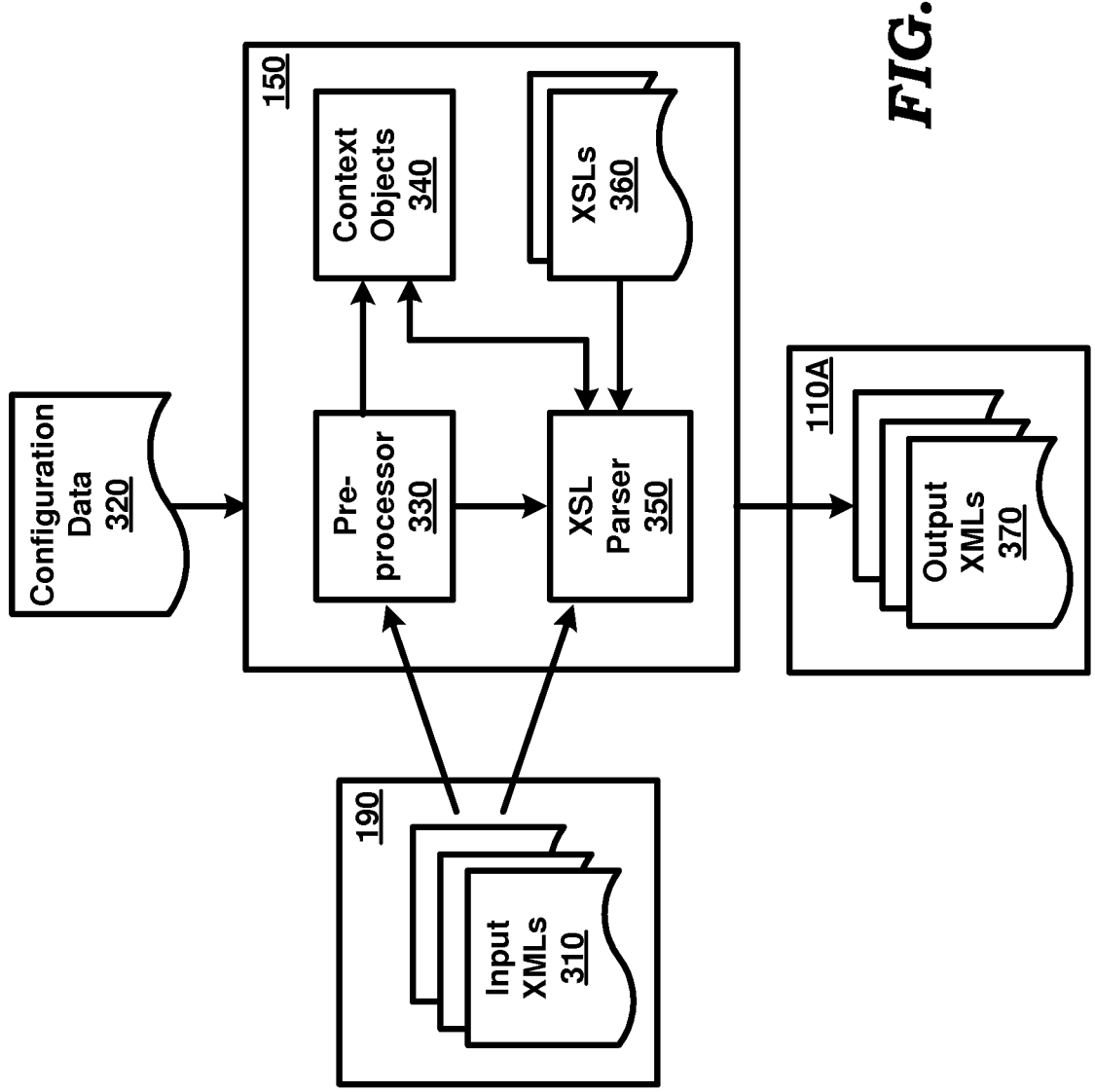
FIG. 3 is a block diagram illustrating the manner in which transformation of input XML data to output data in a desired format is implemented in an embodiment.

FIG. 3 is a block diagram illustrating the manner in which transformation of input XML data to output data in a desired format is implemented in an embodiment. The block diagram is shown containing input XMLs 310, configuration data 320, pre-processor 330, context objects 340, XSL parser 350, XSLs 360 and output XMLs 370. Each of the blocks is described in detail below.

The operation of the various blocks of FIG. 3 is described below with respect to processing of a request for an asset maintained in repository server 190. The request is received by transformation tool 150 from a user/manager using one of client systems 110A-110Z (assumed to be client system 110A for illustration). Transformation tool 150, in response to such a request, first retrieves the metadata for the requested asset from repository server 190.

Thus, input XMLs 310, shown in repository server 190, represents one or more files (or in general, input data) according to XML format that contains metadata corresponding to the requested asset. It should be noted that input XMLs 310 may include data specified according to different XML types (that is, using different sets of elements and respective attributes). A sample input XML data containing the metadata of an asset is shown in FIG. 4 and is described in detail below.

FIGS. 4A and 4B together depicts portions of input XML data (310) received for transformation in one embodiment. Broadly, the input XML data of FIGS. 4A-4B depicts the metadata for a database table asset implemented in one of data stores 180A-180B. The metadata specifies the name of the table (data portions 421 and 422), the details of the columns contained in the table, the primary keys specified for the table (data portions 430) and the foreign keys specified for the table (data portions 450 and 460).

Data portion 410 depicts the details of a element identified as "COMPOSITE" (between the start tag "<Composite>" and end tag "</Composite>" with the data contained between the tags representing the value corresponding to the element). The COMPOSITE element is also shown having associated attribute "xmnls" with a corresponding value. It may be observed that the COMPOSITE element is shown containing other elements such as SCHEMA (data portion 421), NAME (data portion 422), etc. However, the COMPOSITE element is not contained within another element, and is accordingly viewed as a root element (in other words, the first/top element in the XML). Data portions 430, 450 and 460 depict other elements contained in the input XML data received for transformation.

As noted above, the received input XMLs 310 are then processed by transformation tool 150 based on the transformation specified by administrators of the enterprise in configuration data 320. The manner in which configuration data (320) may be specified by administrators and then maintained in a non-volatile storage is described below with examples.

5. Configuration Data

Referring again to FIG. 3, configuration data 320 specifies the manner in which specific input XMLs/asset metadata are to be transformed. Broadly, configuration data 320 specifies for each input XML data, the corresponding one of the XSLs 360 to be used for performing the transformation and the various context objects to be used during the transformation. As noted above, each context object represents an executable module that provides functionalities in addition to the pre-defined functions available in XSL/XPath. An example configuration data specifying the transformations for input XML data is shown in FIG. 5, and is described in detail below.

FIG. 5 depicts portions of a configuration data (320) specifying the transformations to be performed for different input XML data in one embodiment. The configuration data is shown specified according to XML for illustration. In alternative embodiments, the configuration data may be specified using other formats (such as simple text) and/or other data structures (such as a table in a database), as will be apparent to one skilled in the relevant arts by reading the disclosure herein.

Data portion 510 (element "transformation") specifies the type of input XML for which transformation is to be performed, the corresponding XSL file (of XSLs 360) to be used for the transformation and the specific context objects to be used during the transformation. For conciseness, the configuration data is shown specifying the details of a single transformation. Other transformations may be specified similar to data portion 510 based on the specific situation/environment in which transformation tool 150 is deployed. The single transformation specified in data portion 510 is described in detail below.

Data portion 521 indicates a name "Repository Table Transformation" for transformation 510. Data portion 522 (element "input-type") indicates that the transformation 510 is to be performed only for an input XML containing the element "COMPOSITE" as the root element. Thus, transformation 510 is indicated to be performed for the input XML data of FIGS. 4A-4B. Similarly, other transformations in the configuration data may be associated with corresponding root elements, thereby enabling the user to specify the desired transformations for different input XML data.

Data portion 523 (element "xsl") indicates the name "trans.xsl" of the XSL file that is to be used for performing transformation 510, while data portion 525 indicates the names ("nCacheFK", "dbConn", and "IdGen") of the different context objects that are to used during the performance of transformation 350. Each of data portions 530, 540 and 550 (element "context-object") indicates the details of the respective context objects "nCacheFK", "dbConn", and "IdGen" (as indicated by the "name" element within the data portion). The element "class" in data portions 530, 540 and 550 respectively indicate that the context objects "nCacheFK", "dbConn", and "IdGen" are implemented by the respective executable modules/classes named "acme.axt.NodeCache", "acme.axt.DBConnector" and "acme.axt.IDGenerator".

Each of data portions 530, 540 and 550 is also shown specifying the parameters (by name) and corresponding values for each context object. For example, data portion 530 specifies that the context object "nCacheFK" has the parameters "nsPrefixes" indicating the namespaces to be used for the elements, "select" indicating the identifier (the value specified for the parameter, such as "FOREIGN_KEY_CONSTRAINT_LIST_ITEM") of the element to be cached in data portion 535, "key" indicating the identifier to be used for storing (and later retrieving) the cached values and "context-selects" indicating the specific context in which the elements are to stored/retrieved. By specifying desired values for the identifier, an administrator may indicate the specific input elements (required for generating output for other elements) to be cached. Similarly, other data portions specify the details of the parameters for the other context objects.

Thus, an administrator is enabled to specify as configuration data 320, the desired XSL transformations to be performed for different input XML data and the corresponding context objects to be used during the transformation. The manner in which a user/administrator may specify the XSL transformations (360) is described below with examples.

6. Transformation Rules

Referring again to FIG. 3, XSLs 360 represent one or more files that specify transformation rules according to XSL/XPath. As noted above, each transformation rule specifies the output portion (to be included in output XMLs 370) corresponding to an element in input XMLs 310. The rule may be specified based on pre-defined functions provided according to XSL specification or based on the procedures implemented by the various context objects. An example XSL file specifying the XSL transformations is shown in FIGS. 6A and 6B, and is described in detail below.

FIGS. 6A and 6B together depict sample XSL transformation rules to be used for transforming XML data to a desired format in one embodiment. The XSL transformation rules of FIGS. 6A-6B are assumed to be contained in a file named "trans.xsl", the same file name indicated in data portion 523 of the configuration data shown in FIG. 5.

Data portion 610 defines variables corresponding to the context objects used during the transformation. It may be observed that the variables are defined as having the same names ("nCacheFK", "dbConn", and "IdGen") of the context objects defined in data portions 530, 540 and 550. Data portion 620 defines a variable with the name "assetId" and having a value computed based on the invocation of the context object "IdGen". In particular, the procedure named "idg:getID( . . . )" is shown invoked on the context object "IdGen".

Data portion 622 (element "xsl:template") represents a transformation rule specifying that the value of the element "xsl:template" is to be included in the output, when the element "/" (that is the beginning of the XML data) is found in the input XML data. In other words, the data contained between the start and end tags of the "xsl:template" element form an output portion to be included in the output. Thus, data portion 625 indicates that the computed value of the variable "assetId" as being incorporated in the output portion of element 625.

Similarly, data portion 630 defines a variable with the name "fkRefs" (foreign key references) having a value computed based on the invocation of the procedure named "nc:get( . . . )" in the context object "nCacheFK". The computed value of the variable "fkRefs" is shown as being used to generate the output portions in data portions 640 and 660 (based on respective transformation rules). Data portion 650 represents another transformation rule that is shown generating an output portion based on the invocation of the procedure named "dbc:execute( . . . )" in the context object "dbConn".

It may be appreciated that the XSL transformation rules of FIGS. 6A-6B are designed to transform the metadata for a database table asset (such as the data shown in FIGS. 4A-4B) into a more user understandable format. In particular, the transformation rules in data portion 645 causes the identifiers of other table assets to which the current table asset has a reference (that is a foreign key column) to be included in the output. The transformation rules in data portion 640 causes the identifiers of other table assets having a reference (that is a foreign key column) to the current table asset to be included in the output.

It may be also readily observed that some transformation rules (such as those shown in data portions 628 and 645) use pre-defined XSL functions (e.g., select using XPath, concat( ), text( ), etc.), while others invoke the procedures (e.g., nc:get( ), idg:getID( ), dbc:execute( )) of the context objects specified in the configuration data of FIG. 5.

Thus, a user/administrator is enabled to specify various XSL transformation rules (using either pre-defined functions and/or procedures of context objects) for transforming the input XML data to an output in a desired format. Some sample context objects that may be provided to the user/administrator is described below with examples.

7. Sample Context Objects

As noted above, each context object represents an executable module (typically provided external to the executable modules constituting transformation tool 150) that provides functionalities in addition to the pre-defined functions available in XSL/XPath. In an embodiment, a context object is implemented as a corresponding class according to Java™ programming language, with the classes implementing a pre-defined set of procedures to facilitate interfacing with transformation tool 150. The pre-defined set of procedures is specified as an "interface" in Java Programming Language, well known in the relevant arts.

A caching context object, provided according to the present disclosure, is designed to cache/store specific sets of elements contained in the input XML data such that the cached elements are later available for access during the performance of the XSL transformations. An example caching context object is shown in data portion 530 (nCacheFK). The specific elements to be cached are identified based on the element identifiers specified by a user/administrator in configuration data 320 (e.g., data portion 535).

Thus, during a first pass, transformation tool 150 locates input elements (of the input XML data) having identifiers that match the identifiers specified in configuration data 320, and then populates the caching context object with the located elements. During a second pass, in response to determining that an XSL transformation rule requires an element stored in the caching context object, transformation tool 150 invokes the caching context object to retrieve the required element, forms the output portion by incorporating the required element (or a portion thereof) according to the XSL transformation rule, and then includes the formed output portion in the desired format in the output.

Thus, a caching context object facilitates users to specify XSL transformation rules based on previously cached/stored data portions/elements of the input data. The caching context object, accordingly, provides the users the flexibility to store desired element in a cache during a first pass, and then perform XSL transformation rules based on the elements stored in the cache during a second pass of transformation of the input XML data.

A database context object, provided according to the present disclosure, is designed to interface with an external database server (such as data store 180A-180B) for retrieving data used during the performance of the XSL transformations. An example database context object is shown in data portion 540 (dbConn). Accordingly, in response to an XSL transformation rule specifying that the database context object is to be used, transformation tool 150 invokes the database context object to retrieve a data (from a database), forms another output portion by incorporating the retrieved data (or a portion thereof) according to the XSL transformation rule, and then includes the another output portion in the desired format in the output.

In one embodiment, a user is enabled to specify in configuration data 320, desired values for a set of parameters (such as the URL of the database server/data store, the name of the database, the user name/password combination to be used for authentication, etc.) for the database context object. The database context object, accordingly upon invocation, uses the configured values for interfacing and retrieving data from a database server (such as data store 180A-180B). An example set of parameters and corresponding values is shown in data portion 540 of FIG. 5. [001] The usage of such parameters facilitates the same database context object to be configured to interface with (and retrieve data) from different databases.

It should be appreciated that a context object interfacing with a database is described above only for illustration. Other context objects interfacing with different external data sources (such as a file server) may similarly be implemented. Such context objects provide the users the flexibility to incorporate into the output, various portions of data stored on the external data sources. Furthermore, the operation of the context objects interfacing with external data sources is illustrated below with respect to a two pass processing of the input XML data. However, in alternative embodiments, such external data source/database context objects may be operative in a single pass processing environments as well, as will be apparent to one skilled in the relevant arts by reading the disclosure herein.

Thus, the various context objects described above provides enhanced flexibility for users to transform XML data to a desired format. The description is continued illustrating the manner in which the transformation of XML data using the above noted context objects is performed by transformation tool 150 in one embodiment.

8. Two Pass Processing of Input XML Data

Referring again to FIG. 3, pre-processor 330 (executing in transformation tool 150), in response to receiving input XMLs 310, first inspects configuration data 320 to determine (for example, based on a type of the input XML) the specific transformation to be performed for the received input XMLs 310. The description is continued assuming that transformation tool 150 is operative based on the configuration data shown in FIG. 5.

In one embodiment, pre-processor 330 identifies the transformation to be performed based on matching the root element of each file in input XMLs 310 with the root elements specified in configuration data 320. Accordingly, in response to receiving the input XML data of FIGS. 4A-4B, pre-processor 330 identifies that the transformation 510 of the configuration data shown in FIG. 5 is to be applied to the input XML data based on matching of the root element "COMPOSITE" in data portion 410 of the input XML data and data portion 522 of the configuration data 320.

Pre-processor 330 then identifies the specific one of XSLs 360 to be used for the specific transformation and whether there are context objects specified for the specific transformation. Accordingly, pre-processor 330 identifies that the XSL file named "trans.xsl" (of XSLs 360) specified in data portion 523 of the configuration data is to be used for performing the transformation of the input XML data of FIGS. 4A-4B. In other words, pre-processor 330 identifies that the XSL transformation rules shown in FIGS. 6A-6B are to be used for transforming the input XML data of FIGS. 4A-4B.

Pre-processor 330 then determines whether the configuration data indicates that context objects are to be used during the transformation. In a scenario that context objects are specified, pre-processor 330 loads (or creates instances of) the executable modules corresponding to the specified context objects in volatile memory as context objects 340 and then forwards the input XML data (310) to the loaded context objects 340. Thus, based on data portion 525 of the configuration data, pre-processor 330 loads (instances of) the context objects "nCacheFK", "dbConn", and "IdGen" as context objects 340 and then forwards the input XML data of FIGS. 4A-4B to context object 340.

Context objects 340 represent instances (of the corresponding executable modules) loaded in volatile memory (RAM). Context objects 340 receive input XMLs 310 or corresponding in-memory representations (for example, as a corresponding document object model (DOM), well known in the relevant arts) from pre-processor 330 and then processes the received data if required by the logic implemented in the context objects. For example, a caching context object (noted above) may store/populate data portions 450 and 460 of FIG. 4B in a cache (volatile memory) in view of the configuration specified in data portion 535 of FIG. 5. However, it should be noted that a database context object (also noted above) may not perform any processing of the input XML data of FIGS. 4A-4B.

The operation of pre-processor 330 and the populating of context objects 340 together constitute a first pass of processing of the input XMLs 310. After the first pass of processing, pre-processor 330 may invoke (or send an indication to) XSL parser 350 for performing the transformation of input XMLs 310 using the identified one of XSLs 360 and context objects 340. The operation of XSL parser 350 constitutes a second pass of processing of input XMLs 310, during which an output in a desired format is generated.

XSL parser 350 (executing in transformation tool 150) performs the transformation of input XMLs 310 using a specific one of XSLs 360 (as identified by pre-preprocessor 330) and various context objects 340 loaded in memory. In the above example, XSL parser 350 performs the transformation of the input XML data of FIGS. 4A-4B using the XSL transformation rules shown in FIGS. 6A-6B and the context objects "nCacheFK", "dbConn", and "IdGen". It may be appreciated that in a scenario that input XMLs 310 contains multiple files having corresponding transformation specified in configuration data, XSL parser 350 may perform the transformations of successive files in a sequential manner.

The performance of the transformation may entail XSL parser 350 retrieving the transformation rules from the specific one of XSLs 360 (FIGS. 6A-6B), parsing and loading input XMLs 310 as a DOM tree structure, performing a depth-first traversal of the tree to visit each element in the input data, selecting a transformation rule specified in the specific XSL for a visited element, applying the transformation rule to identify output portions, including the output portions in an output (possibly an output tree structure, if the output is according to XML), and then after traversing all the elements in the DOM tree, generating the output of the transformation (for example, from the output tree structure).

It may be appreciated that during the application of the transformation rule, various functions/procedures may be invoked for identifying the corresponding output portions. In the scenario that the invoked functions are pre-defined functions, XSL parser 350 may invoke corresponding modules implemented as part of the parser. Alternatively, if the procedures (such as "nc:get( . . . )", "dbc:execute( . . . )", etc.) are implemented by context objects 340, XSL parser 350 invokes the corresponding context object (e.g., as identified by an identifier specified in the transformation rule such as "nCacheFK", "dbConn", etc.), receives the result of invocation of the procedure/context object and then forms the output portion by incorporating the received result.

XSL parser 350 then sends (to the requesting client system 110A) the generated output as a response to the request for the asset. As noted above, the generated output is generally in a more understandable format, as compared to the metadata stored in repository server 190. A sample output (output XMLs 370) that may be generated by transformation tool 150 is described below with examples.

9. Output in Desired Format

Referring again to FIG. 3, output XMLs 370, shown in client system 110A, represents one or more files (or in general, output data) according to XML format that contains information corresponding to the requested asset. A sample output XML data containing the metadata of an asset is shown in FIG. 7 and is described in detail below.

FIG. 7 depicts portions of output XML data (370) generated by transformation of XML data to a desired format in one embodiment. In particular, the output XML data of FIG. 7 is generated based on elements in the input XML data of FIGS. 4A-4B, the transformation and context objects specified in the configuration data of FIG. 5 and the XSL transformation rules of FIGS. 6A-6B.

Data portion 710, in particular the value "3099" represents an output portion generated based on the XSL transformation rule of data portion 625 and the invocation of the context object "IdGen". Similarly, data portions 730, 740 and 750 represents output portions generated based on the XSL transformation rules of data portions 640 and 660, the invocation of the context object "nCacheFK" and the input elements of data portions 450 and 460 populated in the context object during a first pass of processing.

Data portion 720 represents an output portion generated based on the XSL transformation rule of data portion 650 and the invocation of the context object "dbConn" with the parameter values shown in data portion 540 of the configuration data. It may be observed that data portion 720 contains data (such as the values "50153", "50151", etc.) that are not present in the input XML data of FIGS. 4A-4B and is retrieved from an external source such as a database (e.g. in data stores 180A-180B).

Each of data portions 715, 735, 761 and 762 represents respective output portions generated based on pre-defined functions of XSL/XPath. For example, data portions 715, 761 and 762 are generated based on the respective transformation rules of data portions 628, 671 and 672 and the input elements in the input XML data (such as data portion 422). Similarly, data portion 735 is generated based on the transformation rule of data portion 645, and the input elements in data portions 450 and 460.

It may be observed that data portion 735 indicates the identifiers of two assets to which the current asset ("3099") has a reference (based on the two foreign key columns specified in data portions 450 and 460). However, data portion 730 indicating the assets having a reference to the current asset is indicated to be empty (element), since only a single database table asset (FIGS. 4A-4B) has been received as input for transformation. It may be appreciated that in a scenario that multiple database table assets are received as inputs, transformation tool 150 may store the foreign key column elements from the multiple table assets in the cache during the first pass, thereby enabling the identification of the assets having a reference to the current asset during the second pass. Such an operation of identifying referencing assets is generally not possible to be performed using the pre-defined functions of XSL/XPath.

Thus, transformation tool 150 facilitates the transformation of input XML data to corresponding output data in a desired format. Though the output is shown as being according to XML, in alternative embodiments, the output data may be generated and shown to users in any desired format such as HTML (hypertext markup language), plain text, etc. as will be apparent to one skilled in the relevant arts by reading the disclosure herein.

It should be further appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 8:
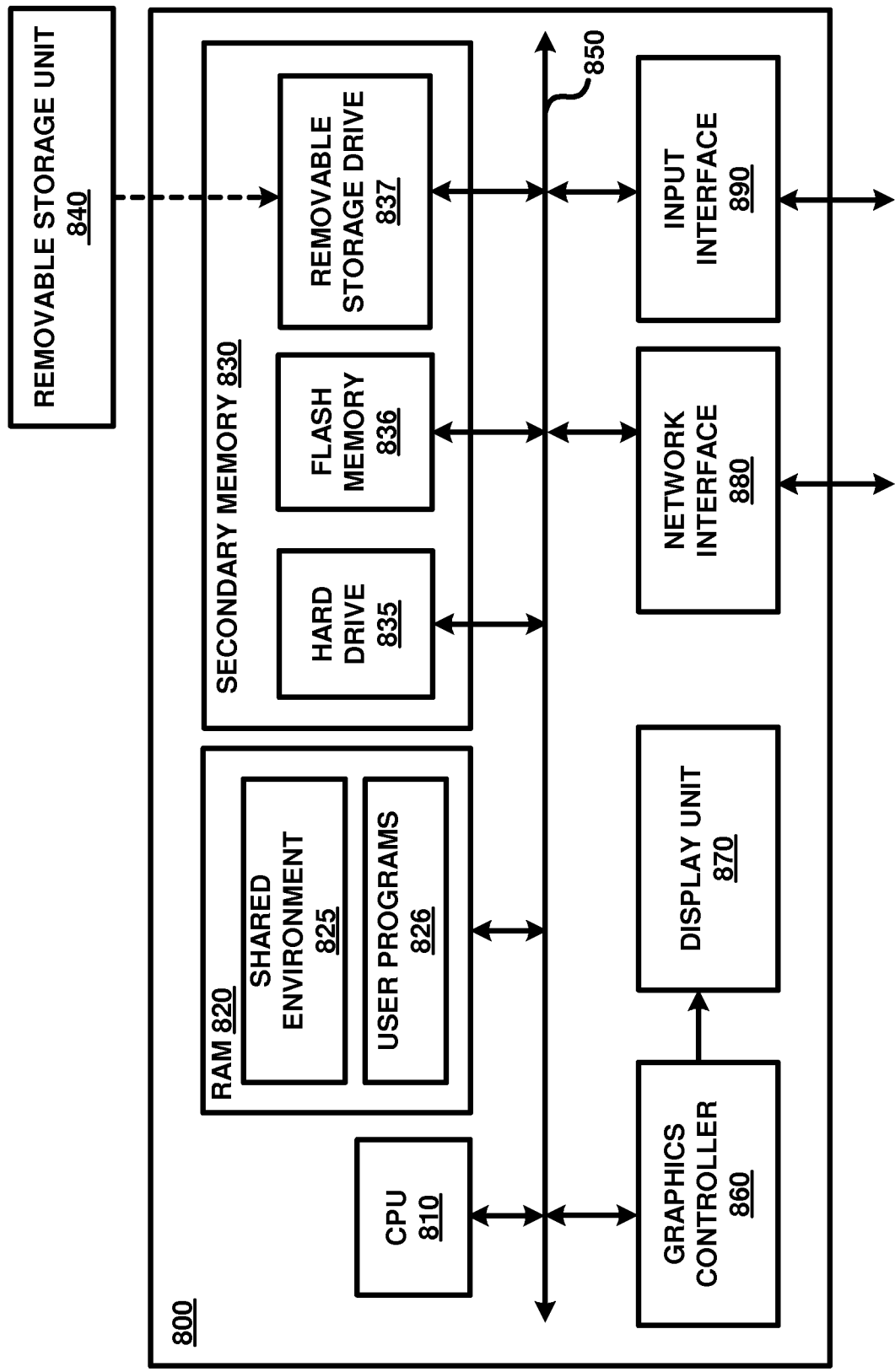
FIG. 8 is a block diagram illustrating the details of digital processing system 800 in which various aspects of the present disclosure are operative by execution of appropriate software instructions.

FIG. 8 is a block diagram illustrating the details of digital processing system 800 in which various aspects of the present disclosure are operative by execution of appropriate software instructions. Digital processing system 800 may correspond to transformation tool 150.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path (bus) 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or user programs 826 (such as client applications, Web browser, RDBMS, etc.). Shared environment 825 includes operating systems, device drivers, virtual machines, etc., which provide a (common) run time environment for execution of user programs 826.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems (such as those shown in FIG. 1) connected to the network.

Secondary memory 830 represents a non-transitory machine readable storage medium, and may store data (e.g., portions of the data shown in FIGS. 4A-4B, 5, 6A-6B and 7) and software instructions (e.g., for performing the actions noted above with respect to FIGS. 2 and 3) which enables system 800 to provide several features in accordance with the present disclosure. The code/instructions stored in secondary memory 430 may either be copied to RAM 820 prior to execution by CPU 810 for higher execution speeds, or may be directly executed by CPU 810.

Secondary memory 830 may contain hard drive 835, flash memory 836, and removable storage drive 837. Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A digital processing system comprising:
    a processor;
    a random access memory (RAM);
    a machine readable medium to store one or more instructions, which when retrieved into said RAM and executed by said processor causes said digital processing system to transform XML (eXtensible Markup Language) data to an output in a desired format, said digital processing system performing the actions of:
    receiving XML data containing a plurality of elements, each element being uniquely identified by a corresponding identifier;
    during a first pass of processing of said XML data, populating a cache with a set of elements of said plurality of elements, the identifiers of each of said set of elements being pre-specified in a configuration data as being required for generating portions of said output for other elements of said plurality of elements, said set of elements including a first element;
    during a second pass of processing of said XML data using a set of XSL (EXtensible Stylesheet Language) transformation rules:
    determining that a first XSL transformation rule of said set of XSL transformation rules specifies a first output portion of said output for a second element, said first XSL transformation rule specifying that said first element is to be used for forming said first output portion for said second element;
    parsing said XML data to identify the occurrence of said second element;
    in response to the occurrence of said second element in said XML data, retrieving said first element from said cache;
    forming said first output portion by incorporating said first element according to said first XSL transformation rule; and
    including said first output portion in said desired format in said output, as a response to occurrence of said first element in said XML data,
    wherein examination of all of said plurality of elements is complete in said first pass prior to start of said second pass.

2. The digital processing system of claim 1, wherein said configuration data specifies a plurality of context objects, each context object being specified for storing a corresponding element type of said set of elements,
    wherein said populating populates each context object with elements of the corresponding element type in said XML data.

3. The digital processing system of claim 2, wherein said plurality of context objects includes a first context object for storing a first element type of said first element, wherein said populating populates said first context object with said first element in said XML data,
    wherein said forming comprises invoking said first context object to retrieve said first element for incorporation in said first output portion.

4. The digital processing system of claim 3, wherein said plurality of context objects are instances of a cache class,
    wherein said cache class has a parameter which can accept a set of potential values, wherein each potential value corresponds to one of said element types,
    wherein said configuration data specifies a corresponding instance of said cache class by specifying for the parameter, a corresponding element type,
    wherein said populating creates instances of said cache class for corresponding element types by specifying the element type for the parameter.

5. A non-transitory machine readable medium storing one or more sequences of instructions for enabling a system to transform XML (eXtensible Markup Language) data and data from an external source to a combined output in a desired format, wherein execution of said one or more instructions by one or more processors contained in said system enables said system to perform the actions of:
    receiving a XML data, said XML data containing a plurality of elements;
    accessing configuration data specifying a plurality of context objects, wherein a first context object of said plurality of context objects is enabled to interface with said external source;
    retrieving a set of XSL (EXtensible Stylesheet Language) transformation rules, wherein each of said set of XSL transformation rules specifies a respective portion of said combined output to be generated based on one or more of said plurality of elements,
    wherein a first XSL transformation rule of said set of XSL transformation rules specifies, for a first element, that said first context object is to be used to generate a first output portion;
    parsing said XML data to identify the occurrence of said first element;

in response to the occurrence of said first element, invoking said first context object, which in turn retrieves a first data from said external source;

forming said first output portion by incorporating said first data according to said first XSL transformation rule; and including said first output portion in said desired format in said output, as a response to occurrence of said first element in said XML data.

6. The machine readable medium of claim 5, wherein said configuration data further specifies for said first context object respective values for a set of parameters, wherein said first context object upon invocation uses the respective values for said set of parameters to interface with said external source and to retrieve said first data.

7. The machine readable medium of claim 6, wherein said external source is a database server, wherein said set of parameters comprise an identifier of the server, an identifier of the database, and authentication information.

8. The machine readable medium of claim 5, wherein said set of XSL transformation rules are stored in a first XSL document, wherein said configuration data includes a first configuration indicating that said first XSL document is to be used for said XML data, wherein said retrieving retrieves said set of XSL transformation rules from said first XSL document in response to said first configuration in said configuration data.

9. The machine readable medium of claim 8, wherein said first configuration further specifies a root identifier indicating that said first XSL document is to be used only when the received XML data includes a root element having said root identifier, further comprising one or more instructions for:

comparing the identifier of said root element in said plurality of elements to said root identifier; and determining that said first XSL document is to be used in response to the identifier of said root element matching said root identifier.

10. A method of transforming XML (eXtensible Markup Language) data to a desired format, said method being implemented in a digital processing system, said method comprising:

receiving XML data containing a plurality of elements, each element being uniquely identified by a corresponding identifier;

accessing configuration data specifying a plurality of context objects and a first set of identifiers, wherein said first set of identifiers uniquely identifies corresponding elements to be stored in a first set of context objects of said plurality of context objects;

inspecting said XML data to locate a set of elements having said first set of identifiers;

populating said first set of context objects with said set of elements located by said inspecting;

retrieving a set of XSL (EXtensible Stylesheet Language) transformation rules, wherein each of said set of XSL transformation rules specifies a respective portion of an output to be generated for one or more of said plurality of elements, said output being in said desired format, wherein a first XSL transformation rule of said set of XSL transformation rules specifies a first output portion for a first element, said first XSL transformation rule specifying that a first context object of said first set of context objects is to be used for forming said first output portion;

parsing said XML data to identify the occurrence of said first element;

in response to the occurrence of said first element, invoking said first context object to retrieve a subset of said set of elements;

forming said first output portion by incorporating said subset of said set of elements according to said first XSL transformation rule; and including said first output portion in said desired format in said output, as a response to occurrence of said first element in said XML data.

11. The method of claim 10, wherein said receiving, said accessing, said inspecting and said populating are performed during a first pass of processing of said XML data, wherein said retrieving, said parsing, said invoking, said forming and said including are performed during a second pass of processing of said XML data, wherein examination of all of said plurality of elements is complete in said first pass prior to start of said second pass.

12. The method of claim 11, wherein said receiving receives said XML data in the form of a plurality of XML documents, wherein said plurality of XML documents are processed sequentially during said first pass such that the processing of all of said plurality of XML documents is complete prior to start of said second pass.

13. The method of claim 10, wherein each of said first set of context objects is a corresponding instance of a cache class, wherein said cache class has a parameter which can accept a set of potential values, wherein each potential value corresponds to an identifier of an element, wherein said configuration data specifies a corresponding instance of said cache class by specifying for the parameter, a corresponding identifier, wherein said populating creates instances of said cache class for corresponding identifiers by specifying the identifier for the parameter.

14. The method of claim 13, wherein each of said plurality of context objects is implemented as corresponding instances of a set of classes, said set of classes including said cache class, wherein each of said set of cache classes is implemented according to Java™ programming language.

15. The method of claim 10, wherein a second context object of said plurality of context objects is enabled to interface with an external source, wherein a second XSL transformation rule of said set of XSL transformation rules specifies, for a second element, that said second context object is to be used to generate a second output portion, wherein in response to said parsing identifying the occurrence of said second element in said XML data, said invoking invokes said second context object, which in turn retrieves a second data from said external source, wherein said forming forms said second output portion by incorporating said second data according to said second XSL transformation rule, wherein said including includes said second output portion in said desired format in said output, as a response to occurrence of said second element in said XML data.

16. The method of claim 15, wherein said configuration data further specifies for said second context object respective values for a set of parameters, wherein said second context object upon invocation uses the respective values for said set of parameters to interface with said external source and to retrieve said second data.

17. The method of claim 16, wherein said external source is a database server, wherein said set of parameters comprise an identifier of the server, an identifier of the database, and authentication information.

18. The method of claim 10, wherein a third context object of said plurality of context objects is enabled to generate a sequence of values,
  wherein a third XSL transformation rule of said set of XSL transformation rules specifies, for a third element, that said third context object is to be used to generate a third output portion,
  wherein in response to said parsing identifying the occurrence of said third element in said XML data, said invoking invokes said third context object, which in turn generates a next value of said sequence as a third data,
  wherein said forming forms said third output portion by incorporating said third data according to said third XSL transformation rule,
  wherein said including includes said third output portion in said desired format in said output, as a response to occurrence of said third element in said XML data.

\* \* \* \* \*